United States Patent [19]
Perrotta et al.

[11] Patent Number: 5,920,293
[45] Date of Patent: Jul. 6, 1999

[54] RADIO FREQUENCY (RF) ANTENNA COUPLER WITH AN ELECTRICALLY EXTENDED GROUND PLANE

[75] Inventors: Alessandro Perrotta, Ft. Lauderdale; David H. Minasi, Plantation; Stephen O. Bozzone, Lauderhill, all of Fla.

[73] Assignee: Motorola, Inc., Schaumburg, Ill.

[21] Appl. No.: 08/904,830

[22] Filed: Aug. 1, 1997

[51] Int. Cl.[6] .............................. H01Q 1/24; H01Q 1/50
[52] U.S. Cl. ...................... 343/906; 343/702; 343/846
[58] Field of Search ................................ 343/702, 906, 343/841, 846, 848; 45/89, 90

[56] References Cited

U.S. PATENT DOCUMENTS

| | | |
|---|---|---|
| 5,532,703 | 7/1996 | Stephens et al. ................ 343/702 |
| 5,668,561 | 9/1997 | Perrotta et al. .................. 343/702 |
| 5,739,791 | 4/1998 | Barefield et al. ................ 343/702 |
| 5,777,585 | 7/1998 | Tsuda et al. ..................... 343/702 |

*Primary Examiner*—Don Wong
*Assistant Examiner*—Tan Ho
*Attorney, Agent, or Firm*—Frank M. Scutch, III

[57] ABSTRACT

An antenna coupling assembly (100) includes an stub section (107) for coupling radio frequency (RF) energy from an RF source to a radio antenna. An antenna coupler ground (113) is positioned adjacent to the stub section (107) and is electrically connected to the ground of the RF source (101). In accordance with the invention, a ground extension section (115,115',115") is attached to the antenna coupler ground (113) for electrically extending the physical length of the antenna coupler ground to enhance efficiency and overall performance of the antenna coupler.

7 Claims, 3 Drawing Sheets

ன்5,920,293

RADIO FREQUENCY (RF) ANTENNA COUPLER WITH AN ELECTRICALLY EXTENDED GROUND PLANE

TECHNICAL FIELD

This invention relates in general to antennas and more particular to antenna couplers for use in mobile adapters.

BACKGROUND

In recent years there has been a growing interest in portable radios, such as two-way radios and cellular telephones. Often a portable radio user will have a need to establish radio communication while in a vehicle. The portable radio, when located inside the vehicle may not perform satisfactorily over long distances because either the portable antenna is insufficient or the vehicle body shields the portable antenna. Thus, the user must either purchase a separate mobile unit or use the portable radio with an external antenna through a mobile adapter.

Coupling losses associated with inserting the portable radio into the mobile adapter are a major concern in the design of any mobile adapter. Conventional methods of connecting a portable radio antenna to an external antenna often require a changeover switch which functions to disconnect or connect the internal and external antennas such that the two antennas are not connected at the same time. Switching between the two antennas, however, has a tendency to degrade the efficiency of the system due to the loss of the associated mechanical or electronic radio frequency (RF) switch. These switch devices and the required RF interface connector also can add significant cost and complexity to the portable subscriber unit.

Another disadvantage associated with many mobile adapters is that some form of power amplification, commonly known as a power "booster", is required to compensate for the coupling losses incurred when the portable radio is inserted into the mobile adapter. An antenna coupler configured to eliminate the need for additional power amplification would be a further advantage in terms of manufacturing costs and parts count.

An alternative method to directly connecting the portable unit's RF path to the mobile adapter via an RF switch is to employ an electromagnetic coupling device in the mobile adapter. The coupler transfers RF energy to and from the portable radio's antenna eliminating the need for a switch and RF connector in the portable subscriber unit.

In applications where the radio antenna cannot be retracted into the radio housing, it is often required to extend the size or length of the antenna coupler to insure the most efficient coupling to the antenna. As seen in prior art FIG. 1, a typical coupling assembly 10 is used where grounding generally is accomplished through direct connection with the ground on the radio 11. The coupling assembly 10 includes a coupler 12 and a ground connection 13 for attachment to the radio ground. A coupling stub 15 is used to couple RF energy from the radio antenna 17 to an external antenna 19.

For best coupling efficiency, the coupling element is usually placed in close proximity to the portable unit's antenna. A fixed antenna, as compared with a retractable antenna is physically cumbersome to meet this requirement and prior art designs had to compromise efficiency for a more ergonomic and compact design. Therefore, a design that does not require proximity along the entire radiating element while still providing high efficiency is most desired.

Accordingly, there exists a need to provide an improved antenna coupler with an electrically extended ground plane beyond that of the ground offered by the radio for use in a mobile adapter. The antenna coupler should minimize RF coupling losses without increasing the overall size of the coupling structure.

DETAILED DESCRIPTION OF THE PREFERRED EMBODIMENT

Figure 1:
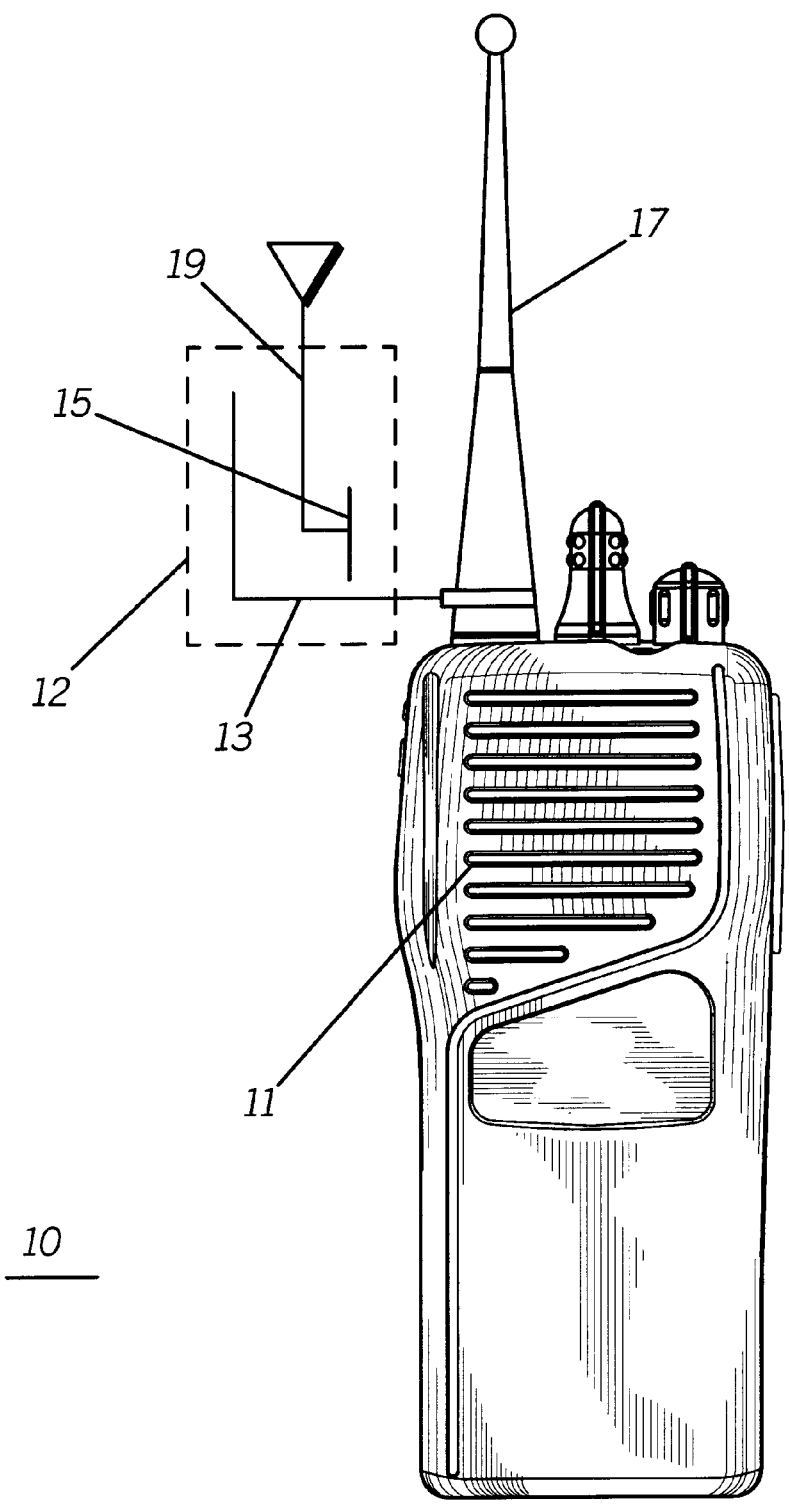
FIG. 1 is a prior art diagram of a typical coupler used in a mobile adapter.
Figure 2:
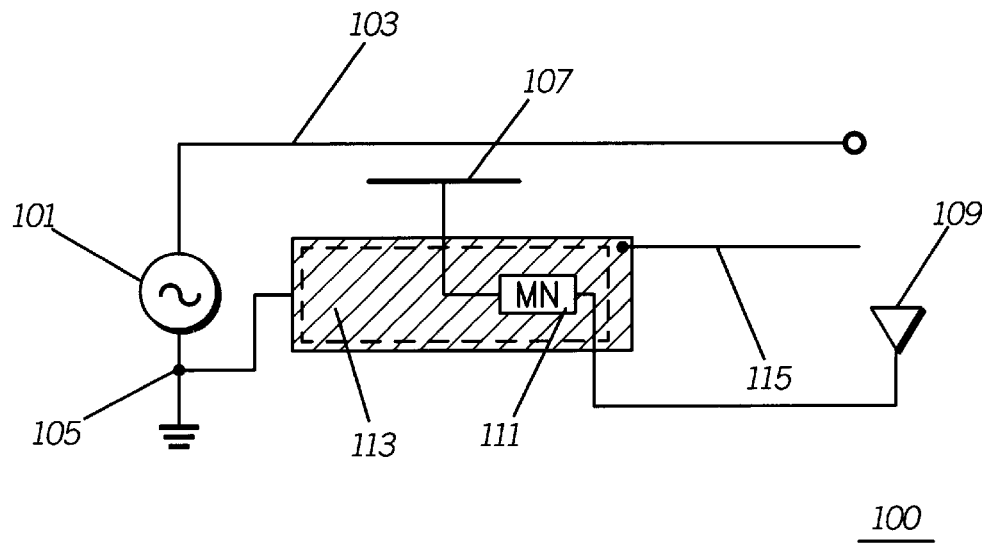
FIG. 2 is a diagram showing operation of the preferred embodiment of the invention.
Figure 3:
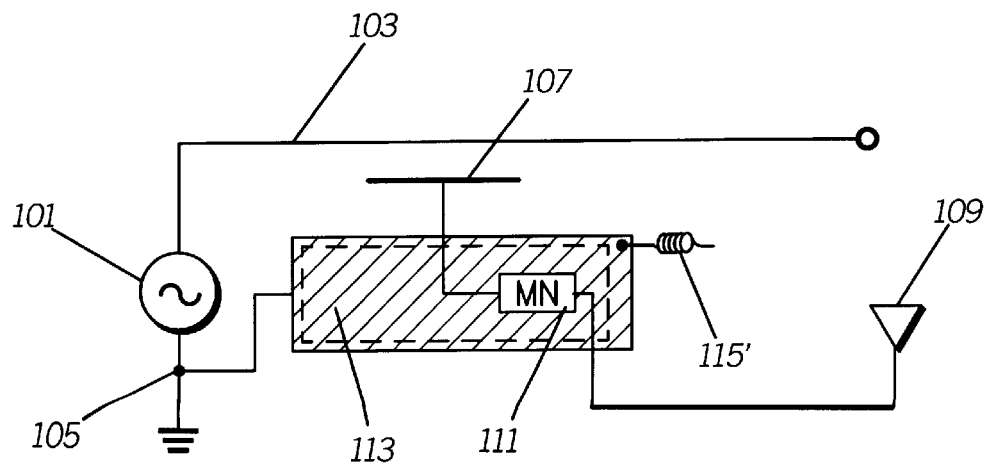
FIG. 3 is a diagram showing operation of another embodiment of the invention using an electrically extended ground plane.
Figure 4:
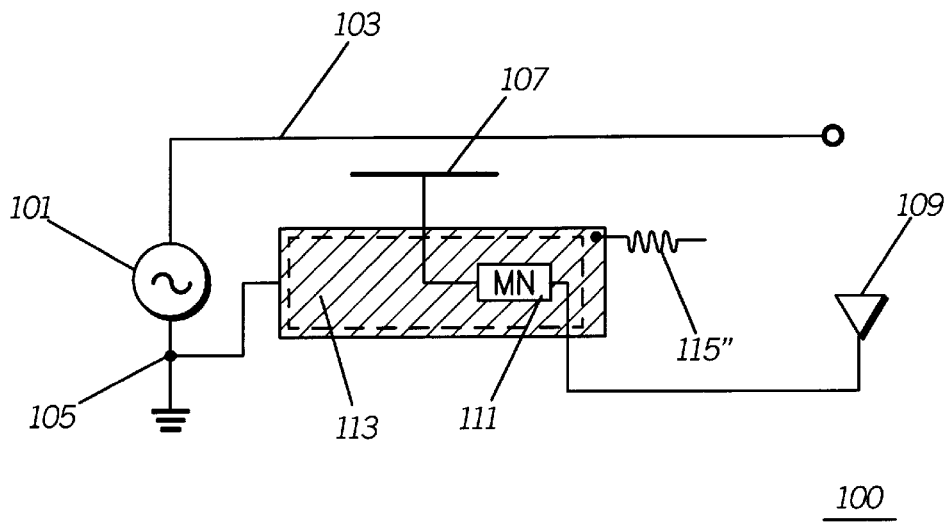
FIG. 4 is an isometric view of the coupler with an electrically extended ground plane.

Referring now to FIGS. 2, 3 and 4, a radio frequency (RF) antenna coupler 100 assembly with an electrically extended ground plane is used in a vehicular adapter for coupling RF energy from a portable radio antenna to an external mobile antenna. The coupler assembly 100 includes an RF source 101 such as a portable radio transmitter for generating RF energy at some predetermined frequency. The RF source 101 is attached to a radio antenna 103. This antenna may be of any type such as retractable or collapsible type whip used on a cellular type telephone or a non-collapsible antenna such a rubber duck type whip. The RF source 101 includes a radio ground 105 that may be an isolated ground or maybe attached to earth ground.

An antenna coupling element or stub 107 is positioned a predetermined distance from the radio antenna 103 for coupling radiating energy from the radio antenna 103 to an external antenna 109. As is well known in the art, the impedance of the external antenna 109 is substantially matched to the coupling stub 107 using a matching network 111. The matching network is typically placed on a circuit board or substrate that includes antenna coupler ground 113 acting as a ground plane or the like for the coupling stub 107. As seen in FIGS. 2 and 3, the ground plane is electrically connected with the radio ground 105. The size of the antenna coupler ground 113 is generally limited by the housing used for the coupler 100. For optimal efficiency, it is best the coupler ground 113 be as large as the radio antenna 103 to work to reflect RF energy into the coupling stub 107.

In order to increase coupling efficiency, the present invention includes a ground extension section 115. The ground extension section 115 is electrically connected with the antenna coupler ground and acts to electrically extend the overall size of the ground extension section 115. As seen in FIG. 2, the ground extension section my be a simple electrical wire extending from surface of the antenna coupler ground 113. As is known in the art, the electrical wire may take the form of a copper trace on a substrate or section of electrically conductive material. As in FIGS. 3 and 4, the physical size of the ground extension section 115 may be reduced by forming the wire conductor into the form of a helical coil 115' or a planar serpentine or meandered structure 115". As will be evident to those skilled in the art, any shape or length may be selected to optimize coupling efficiency.

Thus the present invention enables the antenna coupler ground 113 such as a ground plane to be electrically extended. This has the effect of simulating a ground plane having a larger area that that would be available on the substrate. This increases the efficiency of the coupler stub enabling more RF energy from the radio antenna 103 to be transferred into the coupling stub 107.

Figure 5:
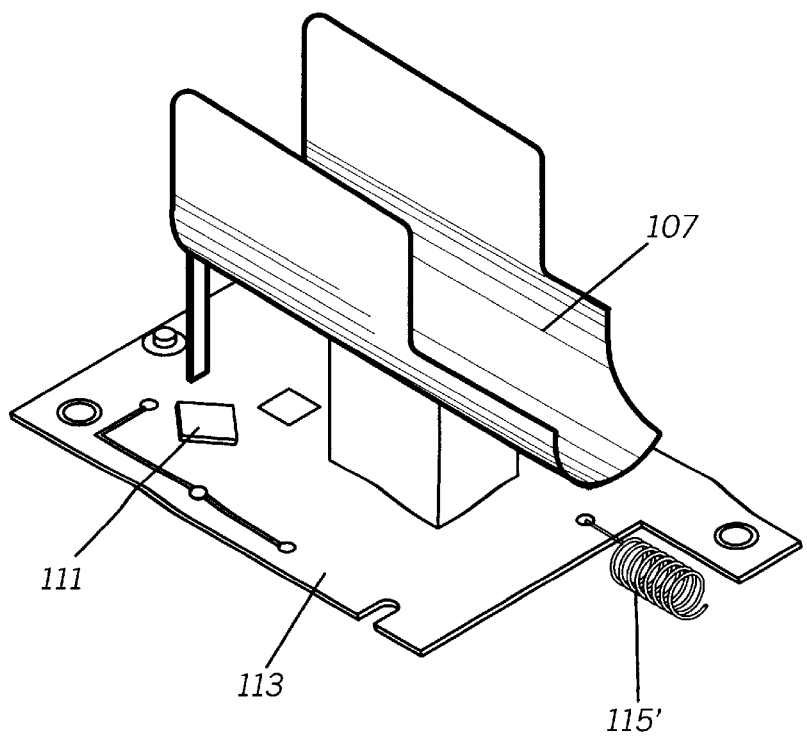
FIG. 5 is an isometric view of the antenna coupler as that described in FIGS. 3 & 4.

In FIG. 5 is isometric view an antenna coupler as described in FIGS. 3 and 4, includes the coupling stub 107 formed into a substantially U-shape and positioned above a substrate including the matching network 111 and coupler ground 113. The ground extension section 115' is shown as a cylindrical helix forming a coil to electrically extend the coupler ground 113 for enhancing the overall coupling efficiency of the antenna coupler.

Moreover the present invention also includes a preferred method of increasing the coupling efficiency of an antenna coupler for transferring radio frequency (RF) energy from a first antenna to a second antenna. The method includes the steps of positioning a coupling element adjacent to the radio or first antenna. Then positioning at least one ground element attached to a ground of an RF source a predetermined distance from the coupling element to allow coupling between the coupling element and the first antenna. Thereafter a ground extension is attached to the at least one ground element to increase its electrical length and acting to increase the efficiency of the antenna coupler.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An antenna coupling assembly for electrically extending a ground plane for use in a vehicular adapter comprising:

an antenna coupler stub for coupling radio frequency (RF) energy from an RF source to a radio antenna;

an antenna coupler ground electrically connected to a ground of the RF source;

a ground extension section for electrically extending the physical length of the antenna coupler ground for enhancing efficiency of the antenna coupler; and wherein the ground extension section is a helical wire for electrically extending the length of the antenna coupler ground.

2. An antenna coupler for use in a vehicular adapter comprising:

a coupling element for coupling radio frequency (RF) energy from a first antenna connected to an RF source to a second antenna;

a ground element positioned below the coupling element and attached to the ground of the RF source; and a ground extension element having a non-linear shape attached to the ground element for electrically extending the electrical length of the ground element.

3. An antenna coupler as in claim 2 wherein the ground extension element is a helical coil.

4. An antenna coupler as in claim 2 wherein the ground extension element is a planar serpentine structure.

5. A method of increasing the coupling efficiency of an antenna coupler for transferring radio frequency (RF) energy from a first antenna to a second antenna in a vehicular adapter comprising the steps of:

positioning a coupling element adjacent to the first antenna;

positioning at least one ground element attached to a ground of an RF source a predetermined distance from the coupling element to allow coupling between the coupling element and the first antenna; and attaching a non-linear shaped ground extension to the at least one ground element to increase its electrical length for increasing the efficiency of the antenna coupler.

6. A method of increasing the coupling efficiency as in claim 5 wherein the non-linear shaped ground extension is a serpentine wire.

7. A method of increasing the coupling efficiency as in claim 5 wherein the non-linear shaped ground extension is a helical coil.

* * * * *